United States Patent
Mukati et al.

(10) Patent No.: US 12,352,199 B1
(45) Date of Patent: Jul. 8, 2025

(54) INLET ASSEMBLY FOR AFTERTREATMENT SYSTEM

(71) Applicant: Caterpillar Inc., Peoria, IL (US)

(72) Inventors: Sharad Mukati, Chennai (IN); Arun V S ., Chennai (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/828,152

(22) Filed: Sep. 9, 2024

(51) Int. Cl.
| | |
|---|---|
| F01N 3/28 | (2006.01) |
| B01D 53/94 | (2006.01) |
| B01F 25/40 | (2022.01) |
| B01F 25/42 | (2022.01) |
| B01F 25/421 | (2022.01) |
| B01F 25/422 | (2022.01) |
| F01N 1/08 | (2006.01) |
| F01N 3/035 | (2006.01) |
| F01N 3/10 | (2006.01) |
| F01N 3/20 | (2006.01) |

(52) U.S. Cl.
CPC ......... F01N 3/2892 (2013.01); B01D 53/944 (2013.01); B01D 53/9477 (2013.01); F01N 3/035 (2013.01); F01N 3/106 (2013.01); F01N 3/2066 (2013.01); B01D 2258/012 (2013.01); B01F 25/40 (2022.01); B01F 25/42 (2022.01); B01F 25/422 (2022.01); B01F 25/4231 (2022.01); B01F 25/4233 (2022.01); F01N 1/088 (2013.01); F01N 2240/20 (2013.01); F01N 2330/38 (2013.01); F01N 2490/08 (2013.01)

(58) Field of Classification Search
CPC combination set(s) only.
See application file for complete search history.

(56) References Cited

U.S. PATENT DOCUMENTS

| | | | |
|---|---|---|---|
| 8,752,370 | B2 | 6/2014 | Hittle et al. |
| 9,802,157 | B2 | 10/2017 | Schmid et al. |
| 10,830,117 | B2 | 11/2020 | Zoran et al. |
| 11,549,422 | B1 * | 1/2023 | Hill ........................... F01N 3/00 |
| 2020/0123955 | A1 * | 4/2020 | Liu ..................... B01F 25/31425 |
| 2020/0165952 | A1 * | 5/2020 | Tucker .................. F01N 3/2896 |
| 2020/0332696 | A1 * | 10/2020 | Chapman ............ B01F 25/4314 |
| 2021/0095587 | A1 * | 4/2021 | Cvelbar ................ F01N 3/2066 |
| 2023/0392534 | A1 | 12/2023 | Luecking et al. |
| 2024/0093624 | A1 * | 3/2024 | Chiruta ................. F01N 3/2066 |
| 2024/0200480 | A1 * | 6/2024 | Pal ...................... B01D 53/9431 |

FOREIGN PATENT DOCUMENTS

| | | |
|---|---|---|
| CN | 202751926 | 2/2013 |
| CN | 216767512 | 6/2022 |
| CN | 219559046 | 8/2023 |

* cited by examiner

*Primary Examiner* — Binh Q Tran

(57) ABSTRACT

An inlet assembly for an aftertreatment system includes an inlet portion that receives a flow of exhaust gases, and a diffuser plate. The diffuser plate includes a body including a first section disposed in front of a first DOC. The first section defines a number of first holes having a first diameter to direct exhaust gases towards the first DOC. The body also includes a second section disposed in front of a second DOC. The second DOC is disposed adjacent to the first DOC in a parallel configuration. The second section defines a number of second holes and an elliptical opening. Each of the number of second holes has a second diameter that is different from the first diameter. The number of second holes and the elliptical opening direct exhaust gases towards the second DOC.

20 Claims, 4 Drawing Sheets

INLET ASSEMBLY FOR AFTERTREATMENT SYSTEM

TECHNICAL FIELD

The present disclosure relates to an aftertreatment system to treat exhaust gases exiting an engine, and more particularly, to an inlet assembly for the aftertreatment system and a method of treating exhaust gases exiting the engine using the aftertreatment system.

BACKGROUND

An engine system includes an engine, such as an internal combustion engine, to generate operating power. In order to comply with emission regulation standards, the engine system includes an aftertreatment system that is disposed downstream of the engine. The aftertreatment system may remove and/or control particulate matter that may be present in exhaust gases exiting the engine before the exhaust gases are let into atmosphere. The aftertreatment system typically includes diesel oxidation catalysts (DOC) that may be arranged in a parallel configuration. The aftertreatment system also includes one or more diesel particulate filters (DPF), a selective catalytic reduction (SCR) module, and a mixing tube disposed between the one or more DPFs and the SCR module. However, in such parallel configuration of the DOCs, the DOCs may not receive uniform flow of exhaust gases from the engine. In other words, one of the DOCs may receive a greater amount of exhaust gases compared to another. In such cases, one of the DOCS may degrade faster than the other and may cause one of the DOCs to be underutilized. It is desirable that the exhaust gases are divided uniformly between the DOCs arranged in the parallel configuration.

U.S. Pat. No. 8,752,370 describes an exhaust aftertreatment system including a housing with two or more inlets configured to receive separate entering exhaust streams from an engine. The system may include two or more first exhaust treatment devices, each configured to receive one of the separate entering exhaust streams in a first direction. The system may further include two or more redirecting flow passages configured to combine the separate exhaust streams into a merged exhaust stream that flows in a second direction about 180 degrees from the first direction and an intermediate flow region configured to divide the merged exhaust stream into two or more separate exiting exhaust streams. The system may also include two or more second exhaust treatment devices, each configured to receive one of the separate exiting exhaust streams in a third direction about 90 degrees from the second direction.

SUMMARY OF THE DISCLOSURE

In an aspect of the present disclosure, an inlet assembly for an aftertreatment system is provided. The aftertreatment system includes a diesel oxidation catalyst (DOC) assembly including a first DOC and a second DOC disposed adjacent to the first DOC in a parallel configuration. The inlet assembly includes an inlet portion adapted to receive a flow of exhaust gases. The inlet assembly also includes a diffuser plate disposed between the inlet portion and the DOC assembly along an exhaust gas flow path. The diffuser plate includes a body. The body includes a first section disposed in front of the first DOC. The first section defines a plurality of first holes. Each of the plurality of first holes has a first diameter. Each of the plurality of first holes directs a portion of the flow of exhaust gases from the inlet portion towards the first DOC. The body also includes a second section disposed in front of the second DOC. The second section defines a plurality of second holes and an elliptical opening adjacent to the plurality of second holes. Each of the plurality of second holes has a second diameter that is different from the first diameter of each of the plurality of first holes. Each of the plurality of second holes and the elliptical opening direct a portion of the flow of exhaust gases from the inlet portion towards the second DOC.

In another aspect of the present disclosure, an aftertreatment system to treat exhaust gases exiting an engine is provided. The aftertreatment system includes an inlet portion adapted to receive a flow of exhaust gases. The aftertreatment system also includes a diesel oxidation catalyst (DOC) assembly in fluid communication with the inlet portion. The DOC assembly includes a first DOC. The DOC assembly also includes a second DOC disposed adjacent to the first DOC in a parallel configuration. The aftertreatment system further includes a diffuser plate disposed between the inlet portion and the DOC assembly along an exhaust gas flow path. The diffuser plate includes a body. The body includes a first section disposed in front of the first DOC. The first section defines a plurality of first holes. Each of the plurality of first holes has a first diameter. Each of the plurality of first holes directs a portion of the flow of exhaust gases from the inlet portion towards the first DOC. The body also includes a second section disposed in front of the second DOC. The second section defines a plurality of second holes and an elliptical opening adjacent to the plurality of second holes. Each of the plurality of second holes has a second diameter that is different from the first diameter of each of the plurality of first holes. Each of the plurality of second holes and the elliptical opening direct a portion of the flow of exhaust gases from the inlet portion towards the second DOC. The aftertreatment system includes a diesel particulate filter (DPF) assembly in fluid communication with and disposed downstream of the DOC assembly along the exhaust gas flow path. The aftertreatment system also includes a selective catalytic reduction (SCR) module in fluid communication with and disposed downstream of the DPF assembly along the exhaust gas flow path.

In yet another aspect of the present disclosure, a method of treating exhaust gases exiting an engine using an aftertreatment system is provided. The aftertreatment system includes a diesel oxidation catalyst (DOC) assembly. The DOC assembly includes a first DOC and a second DOC disposed adjacent to the first DOC in a parallel configuration. The method includes receiving, via an inlet portion of the aftertreatment system, a flow of exhaust gases within the aftertreatment system along a first direction. The method also includes redirecting the flow of exhaust gases from the first direction to a second direction. The first direction is orthogonal to the second direction. The method further includes contacting the flow of exhaust gases with a diffuser plate of the aftertreatment system. The diffuser plate is disposed between the inlet portion and the DOC assembly along an exhaust gas flow path. The diffuser plate includes a body. The body includes a first section disposed in front of the first DOC. The first section defines a plurality of first holes. Each of the plurality of first holes has a first diameter. The body also includes a second section disposed in front of the second DOC. The second section defines a plurality of second holes and an elliptical opening adjacent to the plurality of second holes. Each of the plurality of second holes has a second diameter that is different from the first diameter of each of the plurality of first holes. The method includes uniformly dividing, by each of the plurality of first holes, each of the plurality of second holes and the elliptical opening in the diffuser plate, the flow of exhaust gases into a first stream of exhaust gases and a second stream of exhaust gases. The method also includes flowing the first stream of exhaust gases through the first DOC and the second stream of exhaust gases through the second DOC.

DETAILED DESCRIPTION

Wherever possible, the same reference numbers will be used throughout the drawings to refer to same or like parts.

Figure 1:
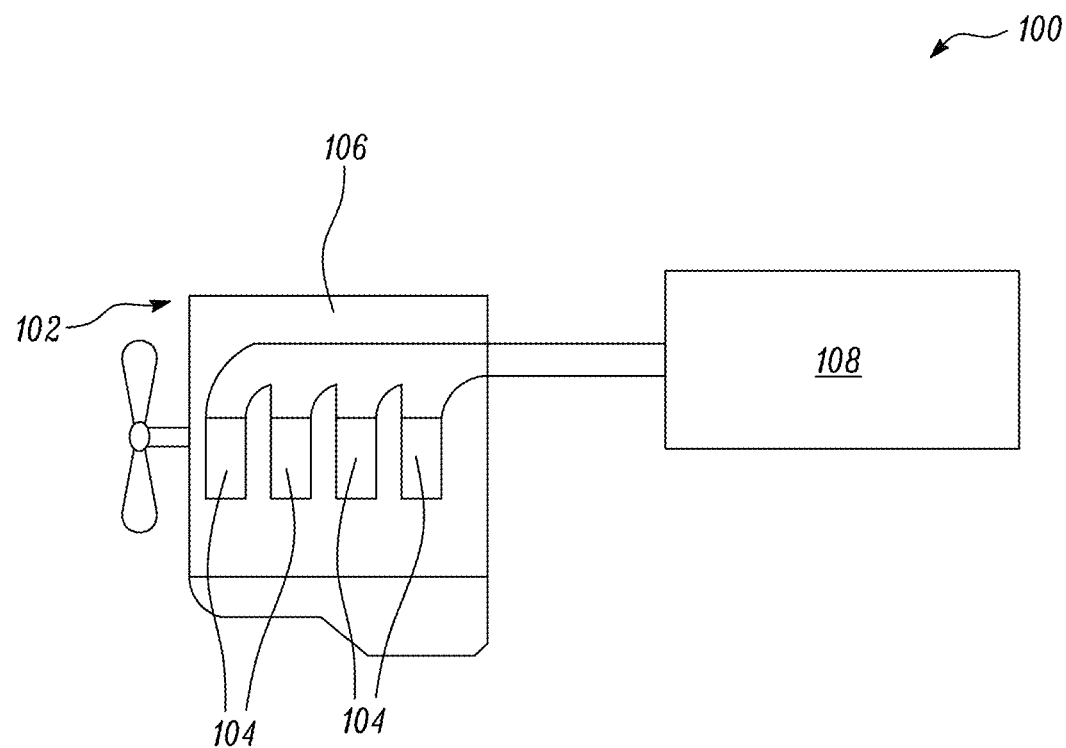
FIG. 1 illustrates a schematic view of an exemplary engine system.

FIG. 1 illustrates a schematic view of an exemplary engine system 100. The engine system 100 may be used in a variety of machines (not shown) including, but not limited to, mobile machines (such as, mining or construction machines), stationary machines, and like. The engine system 100 includes an engine 102. The engine 102 may be any type of engine, such as, an internal combustion engine, may be of any size, with any number of cylinders, any type of combustion chamber, such as, cylindrical, rotary spark ignition, compression ignition, 4-stroke and 2-stroke, etc., and in any configuration, such as, "V," in-line, radial, etc.

The engine 102 may include a number of components (not shown), such as, a crankshaft, a fuel system, an inlet manifold, an intake port, an exhaust port, and the like. Further, the engine 102 includes a number of cylinders 104 that define one or more combustion chambers (not shown). Moreover, exhaust gases generated based on combustion of fuels in the combustion chambers is directed towards an exhaust manifold 106 of the engine 102. The exhaust manifold 106 is in fluid communication with the cylinders 104. It should be noted that the exhaust gases exiting the engine 102 may include particulate matter, such as, carbon monoxide (CO), ammonia, and oxides of nitrogen (NOx), such as, nitric oxide (NO), nitrous oxide ($N_2O$), and nitrogen dioxide ($NO_2$).

The engine system 100 also includes an aftertreatment system 108 to treat the exhaust gases exiting the engine 102. Specifically, the aftertreatment system 108 may operate to reduce/eliminate a concentration of the particulate matter in the exhaust gases, before the exhaust gases are let into atmosphere. The aftertreatment system 108 is in fluid communication with the exhaust manifold 106 of the engine 102.

Figure 2:
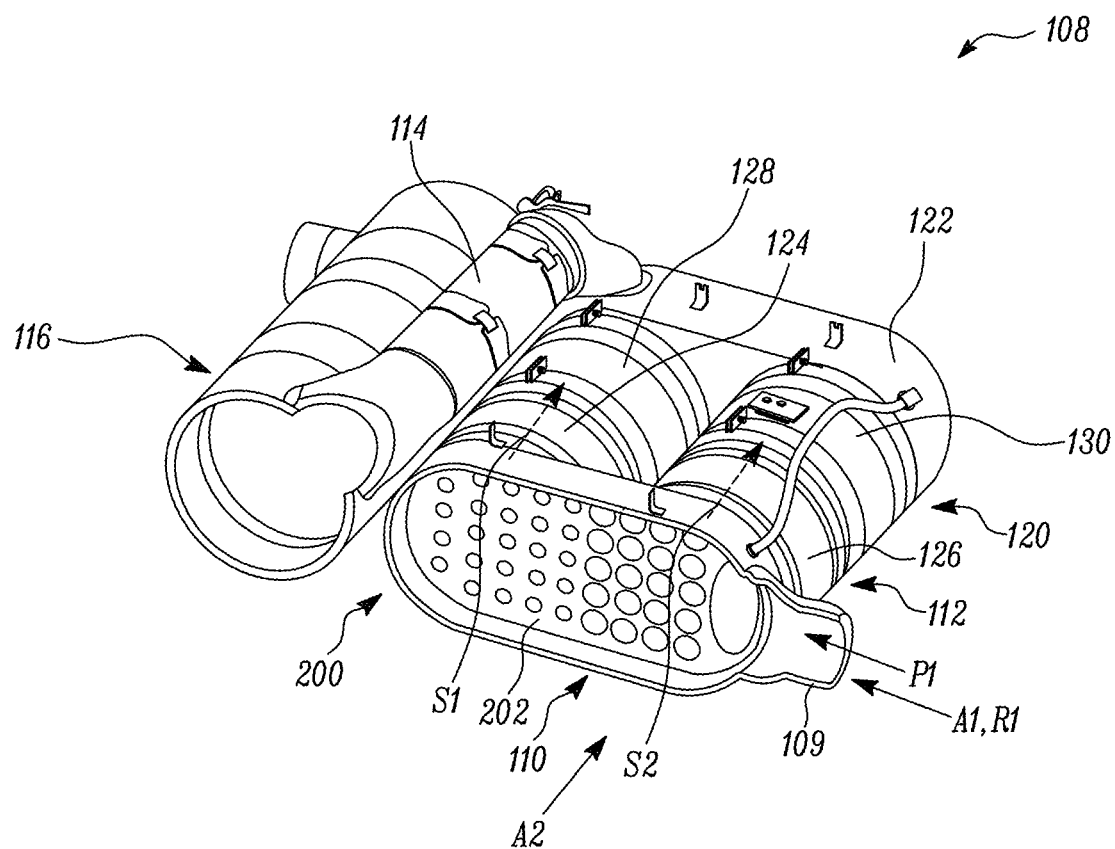
FIG. 2 illustrates a perspective view of an aftertreatment system associated with the engine system of FIG. 1, according to an example of the present disclosure.

FIG. 2 illustrates a perspective view of the aftertreatment system 108, according to an example of the present disclosure. In the illustrated example of FIG. 2, the aftertreatment system 108 includes an inlet portion 109 to receive a flow of exhaust gases. Specifically, an inlet assembly 110 for the aftertreatment system 108 includes the inlet portion 109. Further, the inlet portion 109 is in fluid communication with the exhaust manifold 106 (see FIG. 1) of the engine 102 (see FIG. 1) such that the inlet portion 109 receives the flow of exhaust gases exiting the engine 102 along a first direction A1. The first direction A1 is a radial direction. The first direction A1 will be hereinafter interchangeably referred to as the radial direction A1.

The aftertreatment system 108 also includes a diesel oxidation catalyst (DOC) assembly 112 in fluid communication with the inlet portion 109. The DOC assembly 112 includes a first DOC 124. The DOC assembly 112 also includes a second DOC 126 disposed adjacent to the first DOC 124 in a parallel configuration. The second DOC 126 is disposed proximal to the inlet portion 109.

The aftertreatment system 108 further includes a diffuser plate 200 disposed between the inlet portion 109 and the DOC assembly 112 along an exhaust gas flow path P1. Specifically, the inlet assembly 110 includes the diffuser plate 200. The diffuser plate 200 includes a body 202. The body 202 is elliptical in shape. A shape of the body 202 is based on a profile defined by the first and second DOCs 124, 126. The inlet portion 109 extends in the radial direction A1 relative to the body 202 of the diffuser plate 200. In an example, the diffuser plate 200 is made of stainless steel. In other examples, the diffuser plate 200 may be made of any other metal or alloy, without limiting the scope of the present disclosure.

The aftertreatment system 108 further includes a diesel particulate filter (DPF) assembly 120 in fluid communication with and disposed downstream of the DOC assembly 112 along the exhaust gas flow path P1. The DPF assembly 120 includes a first DPF 128 in fluid communication with the first DOC 124. The DPF assembly 120 also includes a second DPF 130 in fluid communication with the second DOC 126. Each of the first DPF 128 and the second DPF 130 may remove diesel particulate matter or soot from the exhaust gases before the exhaust gases flow downstream to a mixing tube 114.

The aftertreatment system 108 includes the mixing tube 114. The aftertreatment system 108 also includes a selective catalytic reduction (SCR) module 116. The SCR module 116 is in fluid communication with and disposed downstream of the mixing tube 114 along the exhaust gas flow path P1. In some examples, the aftertreatment system 108 may further include an ammonia oxidation catalyst, and various temperature, pressure, and exhaust gas constituent sensors, based on application requirements.

The inlet portion 109 receives the flow of exhaust gases from the engine 102 along the first direction A1. The flow of exhaust gases is redirected from the first direction A1 to a second direction A2 by way of a structure of the aftertreatment system 108. The second direction A2 is an axial direction. The second direction A2 will be hereinafter interchangeably referred to as the axial direction A2. The second direction A2 is orthogonal to the first direction A1. Particularly, the flow of exhaust gases is redirected from the radial direction A1 to the axial direction A2, and accordingly contacts the diffuser plate 200. The diffuser plate 200 uniformly divides the flow of exhaust gases into a first stream S1 of exhaust gases flowing through the first DOC 124 and a second stream S2 of exhaust gases flowing through the second DOC 126.

It should be noted that the first DOC 124 and the second DOC 126 include various catalyst materials disposed in corresponding cannisters. The catalyst materials may collect, absorb, and/or convert CO and/or NOx present in the exhaust gases. Accordingly, CO and NOx present in the exhaust gases may get oxidized and may get converted into carbon dioxide ($CO_2$) and $NO_2$.

Further, the first DPF 128 receives the first stream S1 of exhaust gases from the first DOC 124. The second DPF 130 receives the second stream S2 of exhaust gases from the second DOC 126. In the illustrated example of FIG. 2, the first DPF 128 and the second DPF 130 include a common outlet portion 122. Each of the first DPF 128 and the second DPF 130 removes diesel particulate matter or soot from the first and second streams S1, S2 of exhaust gases before the exhaust gases flow downstream to the mixing tube 114.

Further, the mixing tube 114 is in fluid communication with each of the first DPF 128 and the second DPF 130, via the outlet portion 122. The mixing tube 114 promotes mixing of the exhaust gases with a reductant, for example, diesel exhaust fluid to improve a performance of the aftertreatment system 108. The aftertreatment system 108 also includes a reductant injector (not shown) that injects the reductant in the exhaust gases. In some examples, the reductant may include such as, but not limited to, urea, ammonia, and a water/urea solution.

Moreover, the SCR module 116 receives the exhaust gases from the mixing tube 114. The mixing tube 114 is arranged between the outlet portion 122 and the SCR module 116. The SCR module 116 receives the exhaust gases from the mixing tube 114 and discharges the exhaust gases to atmosphere. The SCR module 116 includes one or more catalyst materials disposed within a canister of the SCR module 116. The catalyst materials may reduce NOx present in the exhaust gases by converting NOx into nitrogen ($N_2$) and water ($H_2O$).

Figure 3:
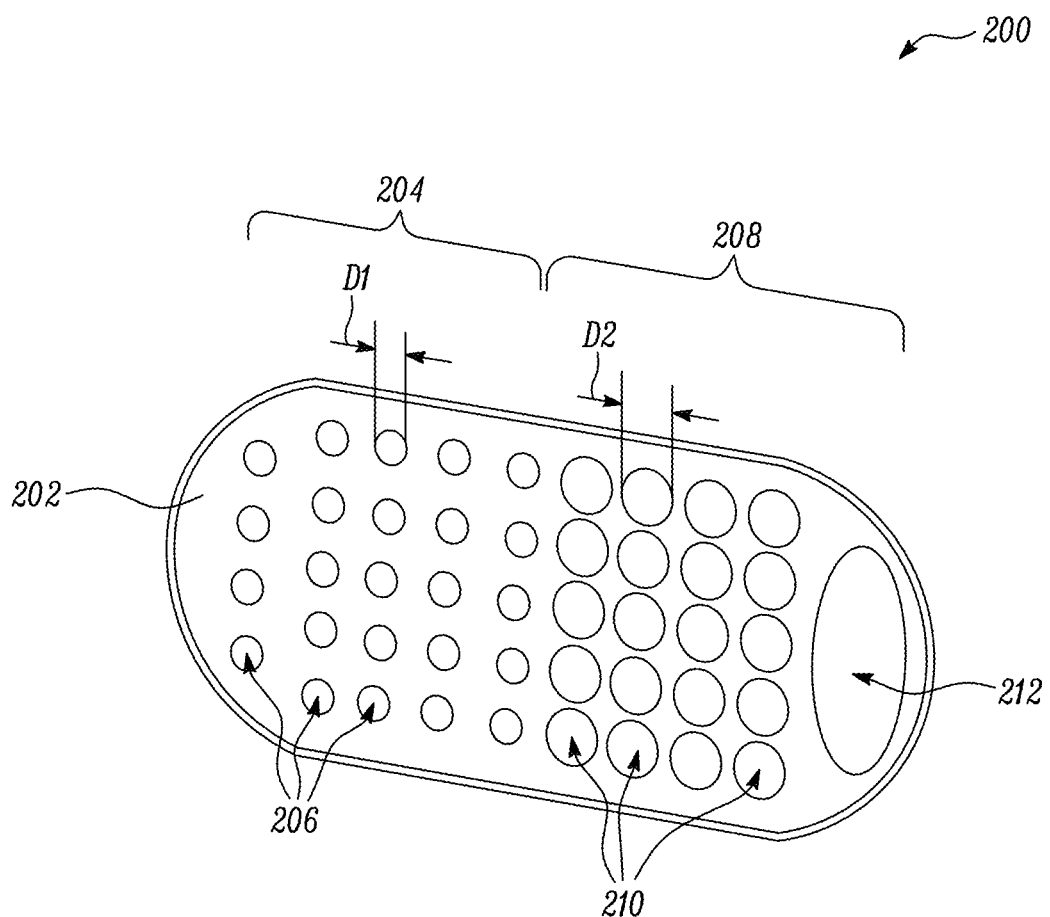
FIG. 3 illustrates a perspective view of a diffuser plate associated with the aftertreatment system of FIG. 2, according to an example of the present disclosure.

Referring to FIG. 3, a perspective view of the diffuser plate 200 is illustrated. As shown in FIG. 3, the body 202 of the diffuser plate 200 includes a first section 204 disposed in front of the first DOC 124 (see FIG. 2). The first section 204 defines a number of first holes 206. The number of first holes 206 are equidistantly spaced apart from each other and arranged in a series of rows and columns. Further, a total number of the first holes 206 depicted in FIG. 3 is exemplary in nature. The number of first holes 206 are circular in shape. Each of the number of first holes 206 has a first diameter D1. In some examples, a value of the first diameter D1 may lie in a range of 20 millimeters (mm) to 40 mm. Each of the number of first holes 206 directs a portion of the flow of exhaust gases from the inlet portion 109 (see FIG. 2) towards the first DOC 124.

The body 202 also includes a second section 208 disposed in front of the second DOC 126 (see FIG. 2). The second section 208 defines a number of second holes 210 and an elliptical opening 212 adjacent to the number of second holes 210. Particularly, the number of second holes 210 are disposed between the number of first holes 206 and the elliptical opening 212. The number of second holes 210 are equidistantly spaced apart from each other and arranged in a series of rows and columns. Further, a total number of the second holes 210 depicted in FIG. 3 is exemplary in nature. The number of second holes 210 are circular in shape. Each of the number of second holes 210 has a second diameter D2 that is different from the first diameter D1 of each of the number of first holes 206. Specifically, the second diameter D2 of each of the number of second holes 210 is greater than the first diameter D1 of each of the number of first holes 206. In some examples, a value of the second diameter D2 may lie in a range of 40 mm to 60 mm. Further, a size of the elliptical opening 212 is greater than the second diameter D2 of the each of the number of second holes 210. In some examples, the elliptical opening 212 defines a major axis and a minor axis. In an example, a value of the major axis may lie between 150 mm and 250 and a value of the minor axis may lie between 60 mm and 120 mm.

Each of the number of second holes 210 and the elliptical opening 212 direct a portion of the flow of exhaust gases from the inlet portion 109 towards the second DOC 126. It should be noted that, the first diameter D1 of each of the number of first holes 206, the second diameter D2 of each of the number of second holes 210, and the size of the elliptical opening 212 are variable based on a size of the inlet portion 109. For example, when the engine 102 (see FIG. 1) is running at high revolutions per minute or when the engine 102 is an eight-cylinder piston engine, the size of the inlet portion 109 may have to be large enough to receive a large amount of exhaust gases from the engine 102. Thus, in order to treat the large amount of exhaust gases, the size of the diffuser plate 200, as well as sizes of the first diameter D1, the second diameter D2, and the elliptical opening 212 may have to increased.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure relates to the aftertreatment system 108 that includes the diffuser plate 200. The diffuser plate 200 includes the body 202. The body 202 includes the first section 204 defining the number of first holes 206, and the second section 208 defining the number of second holes 210 and the elliptical opening 212. Each of the number of second holes 210 has the second diameter D2 that is greater than the first diameter D1 of each of the number of first holes 206. Each of the number of first holes 206 directs the portion of the flow of exhaust gases from the inlet portion 109 towards the first DOC 124. Further, each of the number of second holes 210 and the elliptical opening 212 direct the portion of the flow of exhaust gases from the inlet portion 109 towards the second DOC 126.

The diffuser plate 200 uniformly divides the flow of exhaust gases between the first and second DOCs 124, 126, thereby improving a performance of the aftertreatment system 108 to remove/control the particulate matter present in the exhaust gases. In an example, the first holes 206 may provide a resistance to the exhaust gases flowing therethrough, so that the exhaust gases are also directed to the second DOC 126, thereby uniformly dividing the exhaust gases. The elliptical opening 212 and the second holes 210 may further promote uniform flow of exhaust gases across the first and second DOCs 124, 126. Due to the uniform flow of exhaust gases across the first and second DOCs, 124, 126, each of the first and second DOCs 124, 126 may receive similar amounts of exhaust flow, and a probability of one of the DOCs degrading faster than the other DOC may be reduced. Moreover, the diffuser plate 200 may allow equal utilization of both the DOCs 124, 126. Overall, the diffuser plate 200 described herein is simple in construction, cost effective, and may be retrofitted in existing aftertreatment systems.

Figure 4:
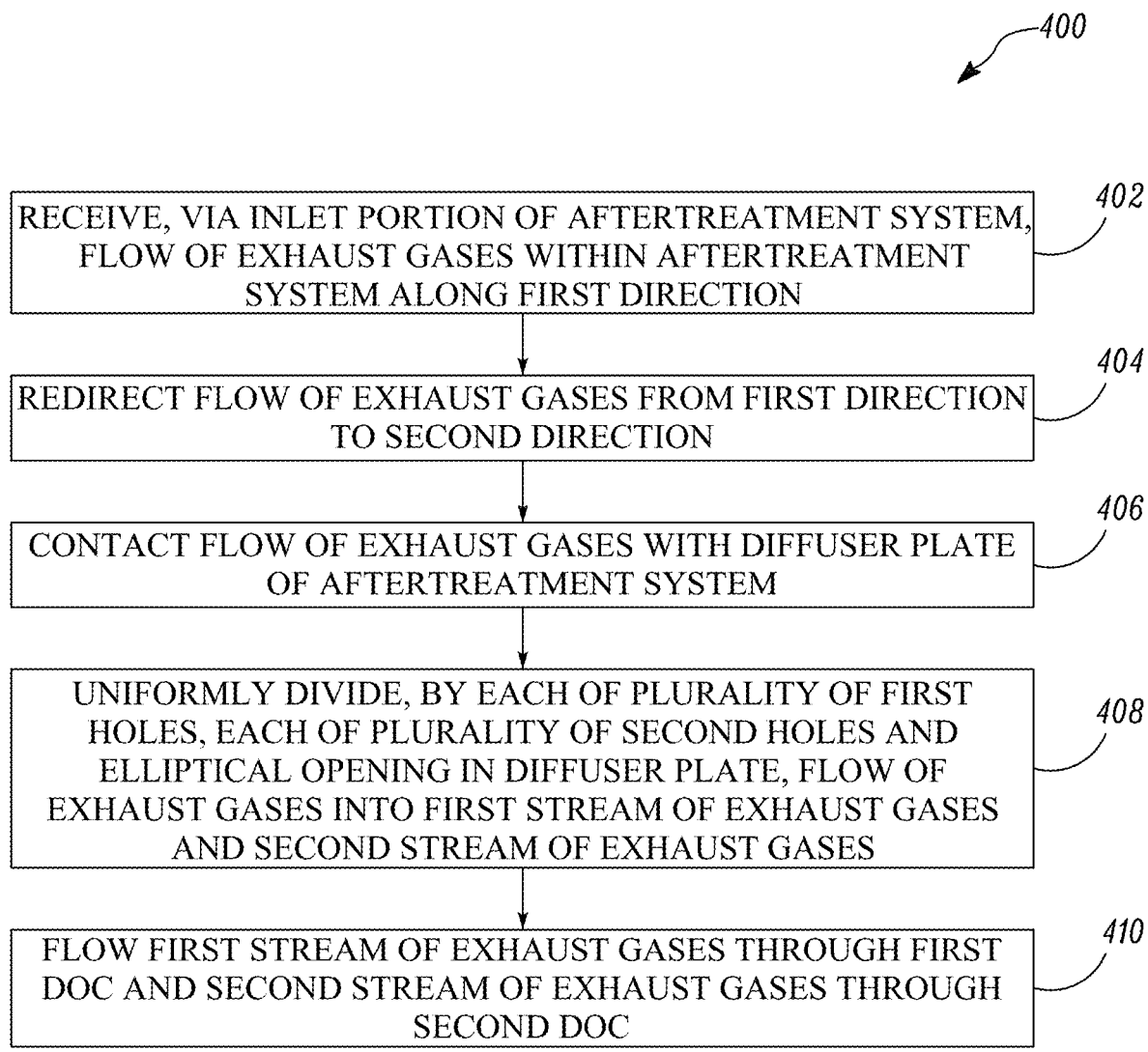
FIG. 4 illustrates a flowchart for a method of treating exhaust gases exiting the engine using the aftertreatment system, according to an example of the present disclosure.

FIG. 4 illustrates a flowchart for a method 400 of treating the exhaust gases exiting the engine 102 using the aftertreatment system 108. The aftertreatment system 108 includes the DOC assembly 112. The DOC assembly 112 includes the first DOC 124 and the second DOC 126 disposed adjacent to the first DOC 124 in the parallel configuration. With reference to FIGS. 1 to 4, at step 402, the inlet portion 109 of the aftertreatment system 108 receives the flow of exhaust gases within the aftertreatment system 108 along the first direction A1. At the step 402, the flow of exhaust gases is received into the aftertreatment system 108 along the radial direction A1.

At step 404, the flow of exhaust gases is redirected from the first direction A1 to the second direction A2. The first direction A1 is orthogonal to the second direction A2. At the step 404, the flow of exhaust gases are redirected from the radial direction A1 to the axial direction A2.

At step 406, the flow of exhaust gases contacts with the diffuser plate 200 of the aftertreatment system 108. The diffuser plate 200 is disposed between the inlet portion 109 and the DOC assembly 112 along the exhaust gas flow path P1. The diffuser plate 200 includes the body 202. The body 202 includes the first section 204 disposed in front of the first DOC 124. The first section 204 defines the number of first holes 206. Each of the number of first holes 206 has the first diameter D1. The body 202 also includes the second section 208 disposed in front of the second DOC 126. The second section 208 defines the number of second holes 210 and the elliptical opening 212 adjacent to the number of second holes 210. Each of the number of second holes 210 has the second diameter D2 that is different from the first diameter D1 of each of the number of first holes 206. The second diameter D2 of each of the number of second holes 210 is greater than the first diameter D1 of each of the number of first holes 206.

At step 408, the flow of exhaust gases is uniformly divided by each of the number of first holes 206, each of the number of second holes 210, and the elliptical opening 212 in the diffuser plate 200, into the first stream S1 of exhaust gases and the second stream S2 of exhaust gases.

At step 410, the first stream S1 of exhaust gases flows through the first DOC 124 and the second stream S2 of exhaust gases flows through the second DOC 126.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An inlet assembly for an aftertreatment system, the aftertreatment system including a diesel oxidation catalyst (DOC) assembly including a first DOC and a second DOC disposed adjacent to the first DOC in a parallel configuration, the inlet assembly including:
    an inlet portion adapted to receive a flow of exhaust gases; and
    a diffuser plate disposed between the inlet portion and the DOC assembly along an exhaust gas flow path, wherein the diffuser plate includes a body, the body including:
        a first section disposed in front of the first DOC, the first section defining a plurality of first holes, wherein each of the plurality of first holes has a first diameter, and wherein each of the plurality of first holes directs a portion of the flow of exhaust gases from the inlet portion towards the first DOC; and
        a second section disposed in front of the second DOC, the second section defining a plurality of second holes and an elliptical opening adjacent to the plurality of second holes, wherein each of the plurality of second holes has a second diameter that is different from the first diameter of each of the plurality of first holes, wherein each of the plurality of second holes and the elliptical opening direct a portion of the flow of exhaust gases from the inlet portion towards the second DOC.

2. The inlet assembly of claim 1, wherein the second diameter of each of the plurality of second holes is greater than the first diameter of each of the plurality of first holes.

3. The inlet assembly of claim 1, wherein the first diameter of each of the plurality of first holes, the second diameter of each of the plurality of second holes, and a size of the elliptical opening are variable based on a size of the inlet portion.

4. The inlet assembly of claim 1, wherein the plurality of second holes are disposed between the plurality of first holes and the elliptical opening.

5. The inlet assembly of claim 1, wherein the inlet portion extends in a radial direction relative to the body of the diffuser plate.

6. The inlet assembly of claim 1, wherein the plurality of first holes and the plurality of second holes are circular in shape.

7. The inlet assembly of claim 1, wherein a size of the elliptical opening is greater than the second diameter of the each of the plurality of second holes.

8. The inlet assembly of claim 1, wherein the diffuser plate is made of stainless steel.

9. An aftertreatment system to treat exhaust gases exiting an engine, the aftertreatment system comprising:
    an inlet portion adapted to receive a flow of exhaust gases;
    a diesel oxidation catalyst (DOC) assembly in fluid communication with the inlet portion, the DOC assembly including:
        a first DOC:
        a second DOC disposed adjacent to the first DOC in a parallel configuration; a diffuser plate disposed between the inlet portion and the DOC assembly along an exhaust gas flow path, wherein the diffuser plate includes a body, the body including:
            a first section disposed in front of the first DOC, the first section defining a plurality of first holes, wherein each of the plurality of first holes has a first diameter, and wherein each of the plurality of first holes directs a portion of the flow of exhaust gases from the inlet portion towards the first DOC; and
            a second section disposed in front of the second DOC, the second section defining a plurality of second holes and an elliptical opening adjacent to the plurality of second holes, wherein each of the plurality of second holes has a second diameter that is different from the first diameter of each of the plurality of first holes, and wherein each of the plurality of second holes and the elliptical opening direct a portion of the flow of exhaust gases from the inlet portion towards the second DOC;
    a diesel particulate filter (DPF) assembly in fluid communication with and disposed downstream of the DOC assembly along the exhaust gas flow path; and a selective catalytic reduction (SCR) module in fluid communication with and disposed downstream of the DPF assembly along the exhaust gas flow path.

10. The aftertreatment system of claim 9, wherein the second diameter of each of the plurality of second holes is greater than the first diameter of each of the plurality of first holes.

11. The aftertreatment system of claim 9, wherein the first diameter of each of the plurality of first holes, the second diameter of each of the plurality of second holes, and a size of the elliptical opening are variable based on a size of the inlet portion.

12. The aftertreatment system of claim 9, wherein the plurality of second holes are disposed between the plurality of first holes and the elliptical opening.

13. The aftertreatment system of claim 9, wherein the inlet portion extends in a radial direction relative to the body of the diffuser plate.

14. The aftertreatment system of claim 9, wherein the plurality of first holes and the plurality of second holes are circular in shape.

15. The aftertreatment system of claim 9, wherein a size of the elliptical opening is greater than the second diameter of the each of the plurality of second holes.

16. The aftertreatment system of claim 9, wherein the diffuser plate is made of stainless steel.

17. A method of treating exhaust gases exiting an engine using an aftertreatment system, the aftertreatment system including a diesel oxidation catalyst (DOC) assembly, the DOC assembly including a first DOC and a second DOC disposed adjacent to the first DOC in a parallel configuration, the method comprising:
 receiving, via an inlet portion of the aftertreatment system, a flow of exhaust gases within the aftertreatment system along a first direction;
 redirecting the flow of exhaust gases from the first direction to a second direction, wherein the first direction is orthogonal to the second direction;
 contacting the flow of exhaust gases with a diffuser plate of the aftertreatment system, wherein the diffuser plate is disposed between the inlet portion and the DOC assembly along an exhaust gas flow path, and wherein the diffuser plate includes a body, the body including:
  a first section disposed in front of the first DOC, the first section defining a plurality of first holes, wherein each of the plurality of first holes has a first diameter; and
  a second section disposed in front of the second DOC, the second section defining a plurality of second holes and an elliptical opening adjacent to the plurality of second holes, wherein each of the plurality of second holes has a second diameter that is different from the first diameter of each of the plurality of first holes;
 uniformly dividing, by each of the plurality of first holes, each of the plurality of second holes and the elliptical opening in the diffuser plate, the flow of exhaust gases into a first stream of exhaust gases and a second stream of exhaust gases; and
 flowing the first stream of exhaust gases through the first DOC and the second stream of exhaust gases through the second DOC.

18. The method of claim 17, wherein the step of receiving, via the inlet portion of the aftertreatment system, the flow of exhaust gases into the aftertreatment system along the first direction includes receiving the flow of exhaust gases into the aftertreatment system along a radial direction.

19. The method of claim 18, wherein the step of redirecting the flow of exhaust gases from the first direction to the second direction includes redirecting the flow of exhaust gases from the radial direction to an axial direction.

20. The method of claim 17, wherein the second diameter of each of the plurality of second holes is greater than the first diameter of each of the plurality of first holes.

* * * * *